Figure 1:
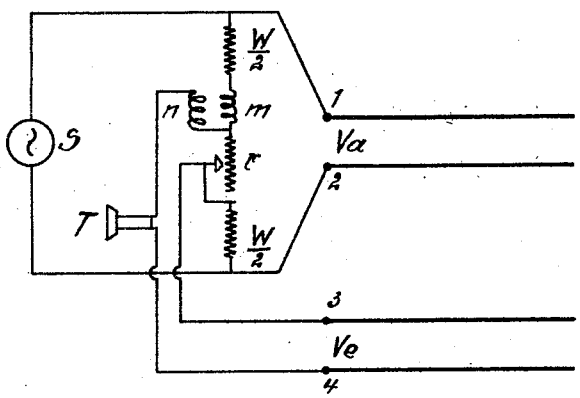

July 7, 1925.

E. SCHÜRER

METHOD FOR MEASURING CROSS TALK

Filed March 28, 1922

1,545,015

INVENTOR:
Eugen Schürer
BY Wm Wallace White
ATT'Y.

Patented July 7, 1925.

1,545,015

UNITED STATES PATENT OFFICE.

EUGEN SCHÜRER, OF COLOGNE-MULHEIM, GERMANY, ASSIGNOR TO FELTEN AND GUILLEAUME CARLSWERK ACTIEN-GESELLSCHAFT, OF COLOGNE-MULHEIM, GERMANY.

METHOD FOR MEASURING CROSS TALK.

Application filed March 28, 1922. Serial No. 547,495.

*To all whom it may concern:*

Be it known that I, EUGEN SCHÜRER, a citizen of Germany, residing at Cologne-Mulheim, Prinz-Wilhelmstrasse 71, Germany, have invented new and useful Improvements in Methods for Measuring Cross Talk, of which the following is a specification.

Cross-talk between the several lines of a multiple-wire telephone system has been measured hitherto by comparing it with the damping of standard lines. The procedure is as follows: Alternating current from a suitable source is led by means of a changing-over device alternately through the standard line and through the lines to be tested to a telephone; in the latter case the current supply is connected to the inducting line, and the telephone is connected to the induced line at the same end of the multiple-wire system. The damping of the standard line at which equal sound intensities are heard in the telephone in both cases, is called the intensity of the cross-talk.

At an adjusted damping of a value $\beta$ the ratio of the initial current intensity to the final current intensity in the standard line is $$\frac{Ia}{Ie} = \frac{1}{2} \cdot e^{\beta}$$

Since in the telephone the adjustment is made for equal final current intensities, the value $\beta$ therefore will represent correctly the intensity of the cross-talk only if the initial current intensities in the standard line and inducing line are equal, and furthermore if the telephone exerts upon the standard line the same reaction as upon the induced line. Both these factors occur only when the apparent resistances at the beginning and end of the standard line are respectively equal to those of the inducing and induced lines.

The tendency of the art has therefore been to make a number of known proposals having the purpose of making the standard lines adjustable not only as regards their damping, but also as regards their apparent resistances at the beginning and at the end, so that these resistances can be made equal to those of the lines to be tested.

But since the apparent resistances of the lines to be tested differ widely according to the length and nature of said lines, and furthermore can be imitated only approximately in the case of long and pupinized lines, the consequence of this is, either great complexity in the construction and use of the standard lines, or it becomes necessary to be satisfied with only a very rough approximation of the measurement according to the circumstances.

With the object of avoiding those drawbacks, according to this invention a new method is employed which consists in this, that while according to the definition, the intensity of the cross-talk is still referred to the measured damping of a standard line, the measurement of the intensity is effected according to this invention by measuring the ratio of the voltage of the inducing line to the voltage of the induced line, instead of by comparison with a standard line. Namely, the damping factor of a line is not only equal to the ratio of the initial current intensity to the final current intensity, but is also equal to the ratio of the initial voltage to the final voltage; it may therefore be measured also by the voltage ratio $$\frac{V_a}{V_e}.$$

According to this invention this is done by compensating $V_e$ by an adjustable part-voltage of $V_a$; and for the purpose of generating the adjustable compensating voltage as such there is employed a connection known per se.

The principle of the new measuring connection is illustrated diagrammatically in Figure 1. The alternating current supply S generates at the terminals 1, 2 of the inducing line a voltage $V_a$. Parallelly thereto there is arranged a high resistance W (of the order of magnitude of about 50,000 ohms) which, for the sake of a symmetrical distribution of the potential is preferably divided into two halves $\frac{W}{2}$ that are connected to each other in series through a small adjustable resistance $r$ and fixed coil $m$ of a variometer. The two ends of the resistance $r$ are connected to the induced line 3, 4 through the movable coil $n$ of the variometer and through a telephone T. The current I is generated in the resistance-series by the voltage, $V_a$. Therefore there is a voltage $I.r$ at the terminals of the resistance $r$, and a voltage $\omega$. M. I at the terminals of the movable coil $n$, where M is the coefficient of the mutual induction, and ω is the circuit frequency.

If $r$ and $n$ be adjusted to bring the telephone T to silence, the geometrical sum of the voltages of $r$ and $n$ compensates as a part-voltage of $V_a$, the voltage $V_e$ that exists at the terminals 3, 4 of the induced line.

Consequently, since the resistances of $r$ and $n$ are extremely small as compared with W, $$\frac{V_a}{V_e} = \frac{W}{\sqrt{r^2 + \omega^2 M^2}} = \frac{1}{2} \cdot e^\beta$$

or $$\beta = \log. \text{ nat } \frac{2W}{\sqrt{r^2 + \omega^2 M^2}}$$

This measurement gives the intensity of the cross-talk in the damping measurement $\beta$, without an actual standard line being required for the purpose. The apparent resistances of the lines need not be taken into consideration; moreover no reaction is produced by the measuring apparatus upon the induced line, because by reason of the fact that the compensating line does not carry any current, the induced line behaves just as if its ends 3, 4 were insulated.

Compared with the comparative measurement with standard lines, the new measuring connection has further the advantage that the damping factor of the cross-talk, instead of being obtained only according to its amount, is now obtained also according to the phase.

Namely from $\frac{\omega \cdot M}{r} = \tan \phi$, we get the mutual phase-displacement φ of the voltages $V_a$ and $V_e$. From this it is possible, in investigating mutually inducing electric circuits, to draw important conclusions concerning the causes of the disturbance, which were not given by the hitherto known method of measurement.

Figure 2:
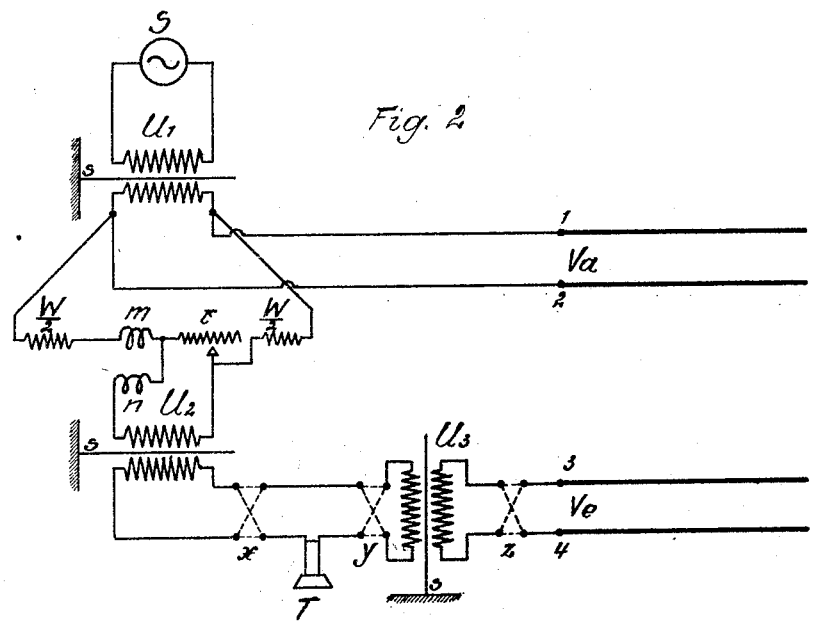

The new method of measurement, the principle of which is illustrated in Figure 1, has yet some drawbacks which are obviated according to this invention in the system of connection illustrated in Figure 2.

Both the source of current supply S and the observer using the telephone T, have an appreciable capacity relatively to earth. Therefore in the system connection illustrated in Figure 1, charging currents would flow through the telephone, and these currents would result in an incorrect compensating adjustment.

According to this invention therefore as illustrated in Figure 2, both the source of current S and the telephone T are separated from the line connections by transformers $U_1$, $U_2$ and $U_3$ which contain screens $s$ that are earthed between the primary and secondary windings.

If the compensating adjustment of $r$ and $n$ is free from faults of the kind stated, the said adjustment must not change when the telephone T is shifted from one branch of the compensating line into the other. For the purpose of ascertaining whether that is the case, change over switches X and Y are provided according to this invention in the line connections illustrated in Figure 2.

The change-over switch Z serves, according to this invention, to enable the line 3, 4 to be connected to the compensating line always in such a manner that the phase of the voltage $V_e$ is opposed to the phase of the compensating voltage generated in $r$ and $n$.

The new measuring connection may, in addition to being used for measuring cross-talk in telephone lines, be also employed with the same advantages for investigating any other electric circuits having mutual influence upon one another, and more particularly for instance, for investigating the freedom from induction of pairs of self-induction coils of the kind described in German Patent No. 329,481, and for carrying into execution the equalizing method for these coils described in German Patent No. 334,365.

Having now described my invention, I claim:

1. An arrangement for measuring cross-talk between the lines of a multi-wire telephone system, comprising in combination an adjustable compensator consisting of two sets of resistances and a variometer adapted to be connected to the terminals of a telephone circuit, a source of alternating current connected to the said terminals and a telephone connected in said system and to the terminals of a second telephone circuit of which the cross-talk is to be measured by means of the voltage induced by the first mentioned circuit, at the terminals of the second circuit being compensated by means of the compensator with a portion of the voltage supplied to the terminals of the first telephone circuit.

2. The arrangement as claimed in claim 1, in combination with a transformer provided with an earthing screen between the primary and secondary windings inserted in the connections between the source of alternating current and the compensator, and a transformer provided with a similar earthing screen inserted in the connections between the telephone and the compensator.

3. The arrangement as claimed in claim 1, in combination with a transformer provided with an earthing screen between the primary and secondary windings, inserted in the connections between the source of alternating current and the compensator, a transformer provided with a similar earthing screen, inserted in the connections between the telephone and the compensator, and two change-over switches inserted in the second telephone circuit one on either side of the said telephone.

4. The arrangement as claimed in claim 1 in combination with a transformer provided with an earthing screen between the primary and secondary windings, inserted in the connections between the source of alternating current and the compensator, a transformer provided with a similar earthing screen, inserted in the connections between the telephone and the compensator, two change-over switches inserted in the second telephone circuit one on either side of the said telephone, and a change-over switch connected between the terminals of the second telephone circuit and the compensator.

The foregoing specification signed at Cologne, Germany this 6th day of March, 1922.

EUGEN SCHÜRER.

In presence of—
  HENRY W. HAAS,
  E. ROUTZ.